(12) United States Patent
Malalur (10) Patent No.: US 8,086,571 B2
(45) Date of Patent: Dec. 27, 2011

(54) TABLE LOOKUP MECHANISM FOR ADDRESS RESOLUTION

(75) Inventor: Govind Malalur, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 12/536,095

(22) Filed: Aug. 5, 2009

(65) Prior Publication Data

US 2010/0014516 A1  Jan. 21, 2010

Related U.S. Application Data

(62) Division of application No. 09/714,273, filed on Nov. 17, 2000, now Pat. No. 7,593,953.

(60) Provisional application No. 60/166,225, filed on Nov. 18, 1999.

(51) Int. Cl.
*G06F 17/00* (2006.01)

(52) U.S. Cl. ......... 707/673; 707/711; 707/715; 707/716

(58) Field of Classification Search .................. 707/673, 707/711, 715, 716
See application file for complete search history.

(56) References Cited

U.S. PATENT DOCUMENTS

| | | | |
|---|---|---|---|
| 4,837,447 A | 6/1989 | Pierce et al. | |
| 5,278,789 A | 1/1994 | Inoue et al. | |
| 5,390,173 A | 2/1995 | Spinney et al. | |
| 5,414,704 A | 5/1995 | Spinney | |
| 5,423,015 A | 6/1995 | Chung | |
| 5,440,734 A | 8/1995 | Wagar | |
| 5,459,717 A | 10/1995 | Mullan et al. | |
| 5,473,607 A | 12/1995 | Hausman et al. | |
| 5,499,295 A | 3/1996 | Cooper | |
| 5,506,624 A | 4/1996 | Moreton | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,724,033 A | 3/1998 | Burrows | |
| 5,742,613 A | 4/1998 | MacDonald | |
| 5,745,889 A | 4/1998 | Burrows | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |

(Continued)

FOREIGN PATENT DOCUMENTS

EP 0312917 4/1989

(Continued)

OTHER PUBLICATIONS

Tanenbaum, A. S., "Computer Networks", Prentice-Hall Int.,USA, XP-002147300, Sec.5.2-Sec.5.3, Routing Algorithms,(1998), pp. 309-320.

(Continued)

*Primary Examiner* — Sana Al Hashemi (57) ABSTRACT

A table lookup indexing system for the transmission of data packets in a network switch. Data is received in an input port and is divided into two parts, an index portion and a bucket portion. The index portion selects a particular bucket and the combination of the index portion and bucket portion selects a specific entry in the table.

13 Claims, 10 Drawing Sheets

U.S. PATENT DOCUMENTS

| | | | |
|---|---|---|---|
| 5,802,052 A | 9/1998 | Venkataraman | |
| 5,802,287 A | 9/1998 | Rostoker et al. | |
| 5,825,772 A | 10/1998 | Dobbins et al. | |
| 5,828,653 A | 10/1998 | Goss | |
| 5,831,980 A | 11/1998 | Varma et al. | |
| 5,842,038 A | 11/1998 | Williams et al. | |
| 5,845,081 A | 12/1998 | Rangarajan et al. | |
| 5,852,607 A | 12/1998 | Chin et al. | |
| 5,860,136 A | 1/1999 | Fenner | |
| 5,864,535 A | 1/1999 | Basilico | |
| 5,887,187 A | 3/1999 | Rostoker et al. | |
| 5,892,922 A | 4/1999 | Lorenz | |
| 5,898,687 A | 4/1999 | Harriman et al. | |
| 5,909,686 A | 6/1999 | Muller et al. | |
| 5,918,074 A | 6/1999 | Wright et al. | |
| 5,940,596 A | 8/1999 | Rajan et al. | |
| 5,966,703 A | 10/1999 | Burrows | |
| 5,987,507 A | 11/1999 | Creedon et al. | |
| 5,999,596 A | 12/1999 | Walker et al. | |
| 6,011,795 A | 1/2000 | Varghese et al. | |
| 6,041,053 A | 3/2000 | Douceur et al. | |
| 6,046,979 A | 4/2000 | Bauman | |
| 6,061,351 A | 5/2000 | Erimli et al. | |
| 6,067,547 A | 5/2000 | Douceur | |
| 6,119,196 A | 9/2000 | Muller et al. | |
| 6,175,902 B1 | 1/2001 | Runaldue et al. | |
| 6,185,185 B1 | 2/2001 | Bass et al. | |
| 6,690,667 B1 | 2/2004 | Warren | |
| 6,829,217 B1 * | 12/2004 | Bechtolsheim et al. | 370/229 |
| 7,299,282 B2 * | 11/2007 | Sarkissian et al. | 709/224 |

FOREIGN PATENT DOCUMENTS

| | | |
|---|---|---|
| EP | 0465090 | 1/1992 |
| EP | 0594196 | 4/1994 |
| EP | 0845889 | 6/1998 |
| EP | 0849917 | 6/1998 |
| EP | 0853441 | 7/1998 |
| EP | 0854606 | 7/1998 |
| EP | 0859492 | 8/1998 |
| EP | 0862349 | 9/1998 |
| EP | 0907300 | 4/1999 |
| EP | 0752796 | 1/2007 |
| FR | 2725573 | 4/1996 |
| JP | 4-189023 | 7/1999 |
| WO | 98/09473 | 3/1998 |
| WO | 99/00936 | 1/1999 |
| WO | 99/00938 | 1/1999 |
| WO | 99/00939 | 1/1999 |
| WO | 99/00944 | 1/1999 |
| WO | 99/00945 | 1/1999 |
| WO | 99/00948 | 1/1999 |
| WO | 99/00949 | 1/1999 |
| WO | 99/00950 | 1/1999 |
| WO | 99/14906 | 3/1999 |

OTHER PUBLICATIONS

Cisco Systems, Inc., "Catalyst 8500 CSR Architecture", White paper XP-002151999, (1998), 1-19 pages.

Lin, Yu-Sheng et al., "Queue Management for shared buffer and shared multi-buffer ATM switches", Department of electronics engineering & institute of electronics, National ChiaoTung University, Hsinchu, Taiwan, R.O.C.,(Mar. 24, 1996), pp. 688-695.

Tanenbaum, T. S., "Computer Networks", Prentice-Hall Int.,USA, XP-002 147300(1998) Sec. 5.2- Sec. 5.3, pp. 309-320.

"Local Area Network Switch Frame Lookup Techniquefor Increased Speed and Flexibility", 700 IBM Technical Disclosure Bulletin vol. 38, No. 7, Armonk, NY, US, (Jul. 1995), pp. 221-222.

Chemarin, Alain et al., "A High-Speed CMOS Circuit for 1.2-Gb/s 16 ×16 ATM Switching", 8107 IEEE Journal of Solid-State Circuits, vol. 27, No. 7, NewYork, US, (Jul. 1992),1116-1120.

Kondoh, Harufusa et al., "A 622-Mb/s 8 ×8 ATMSwitch ChipSetwith Shared Multibuffer Architecture", 8107 IEEE Journal of Solid-State Circuits, vol. 28, No. 7, NewYork, US,(Jul. 1993), pp. 808-814.

Postel, J. "User Datagram Protocol", http://www.faqs.org/rfcs/rfc768.html,(Aug. 28, 1980), 4 pages.

PCT/US2000/30144, "International Search Report received for PCT Application No. PCT/US2000/30144 mailed on Apr. 2, 2001", 8 pages.

* cited by examiner

TABLE LOOKUP MECHANISM FOR ADDRESS RESOLUTION

CROSS REFERENCE TO RELATED APPLICATIONS

This application is a divisional of U.S. patent application Ser. No. 09/714,273, filed Nov. 17, 2000, now U.S. Pat. No. 7,593,953 entitled "TABLE LOOKUP MECHANISM FOR ADDRESS RESOLUTION," which claims the benefit of U.S. Provisional patent application No. 60/166,225 filed on Nov. 18, 1999. The contents of which are incorporated by reference herein in its entirety.

BACKGROUND OF THE INVENTION

1. Field of the Invention

The present invention is directed to a method and apparatus for a table lookup index that provides access to a table, such as an addressing table, in a fast and efficient manner. More specifically the table lookup index is for the transmission of data packets in a network switch.

2. Description of the Prior Art

In the world of data transmission it is necessary to transmit data as quickly as possible, in order to have almost instantaneous access to information.

Table lookups are frequently used to index information to give quick access to much needed data. For example in network switching it is imperative that when data is received in a port the appropriate port for output be identified in order to transfer data. Therefore table lookups are utilized to store information regarding incoming data that directs the incoming data to an appropriate port for output.

In the field of table look-ups there are several methods used to access information. One method is a linear index.

Figure 1A:
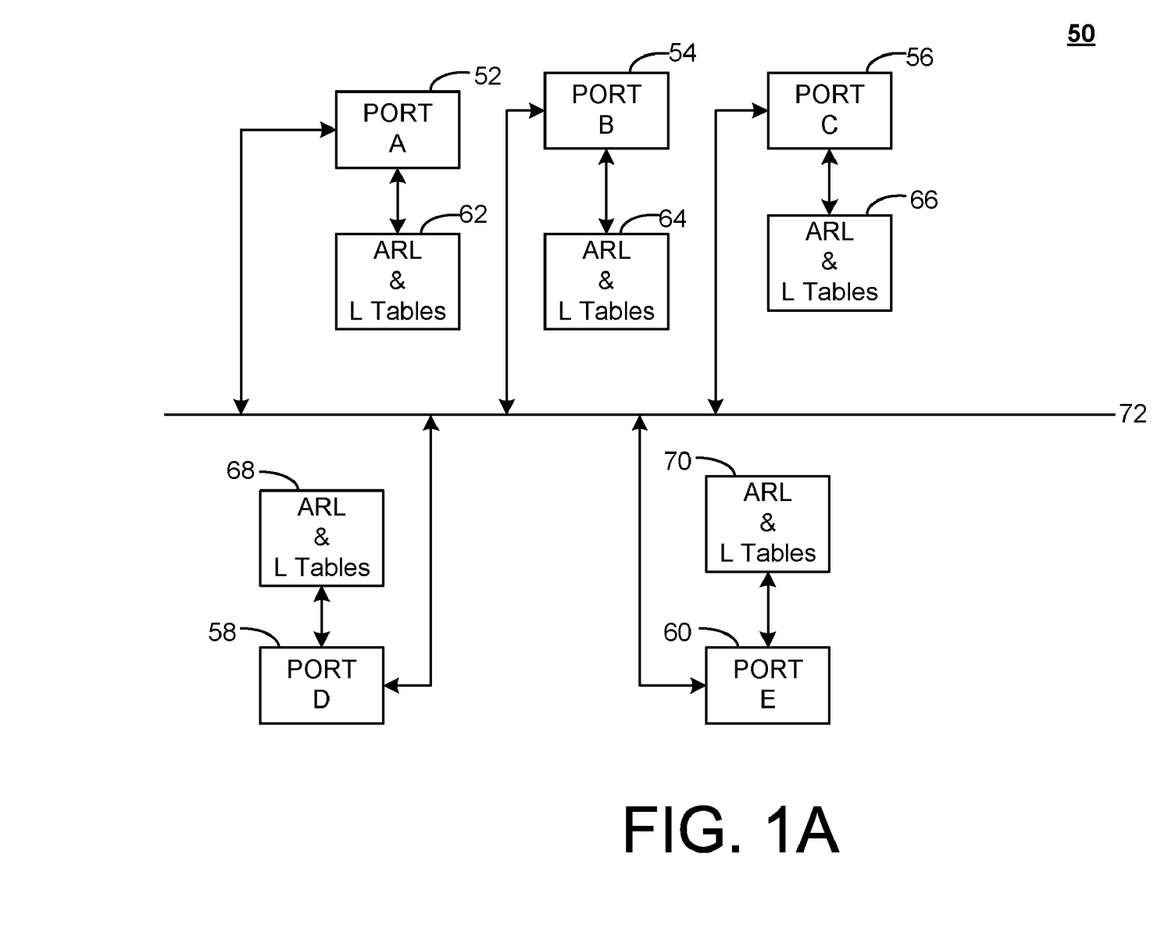
FIG. 1A is an illustration of a network switch having look-up tables (L Tables) and Address Resolution Logic (ARL)
Figure 1B:
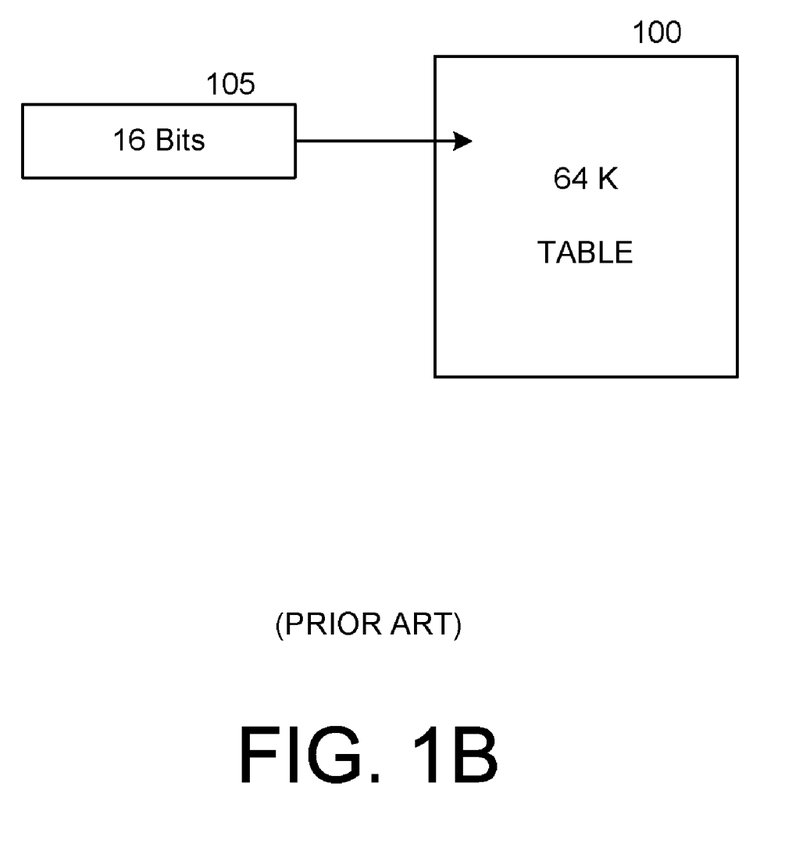
FIG. 1B is an illustration of a 16 bit index and a 64K table of the prior art.

FIG. 1B illustrates a 64K table 100 that is linearly indexed. Index 105 for a 64K table is required to be 16 bits long ($2^{16}$=64K) to linearly access entries in the table. Since the index linearly accesses entries in the table, there is a one to one correspondence between each index and each table entry (i.e. each index has a corresponding table entry).

Figure 1C:
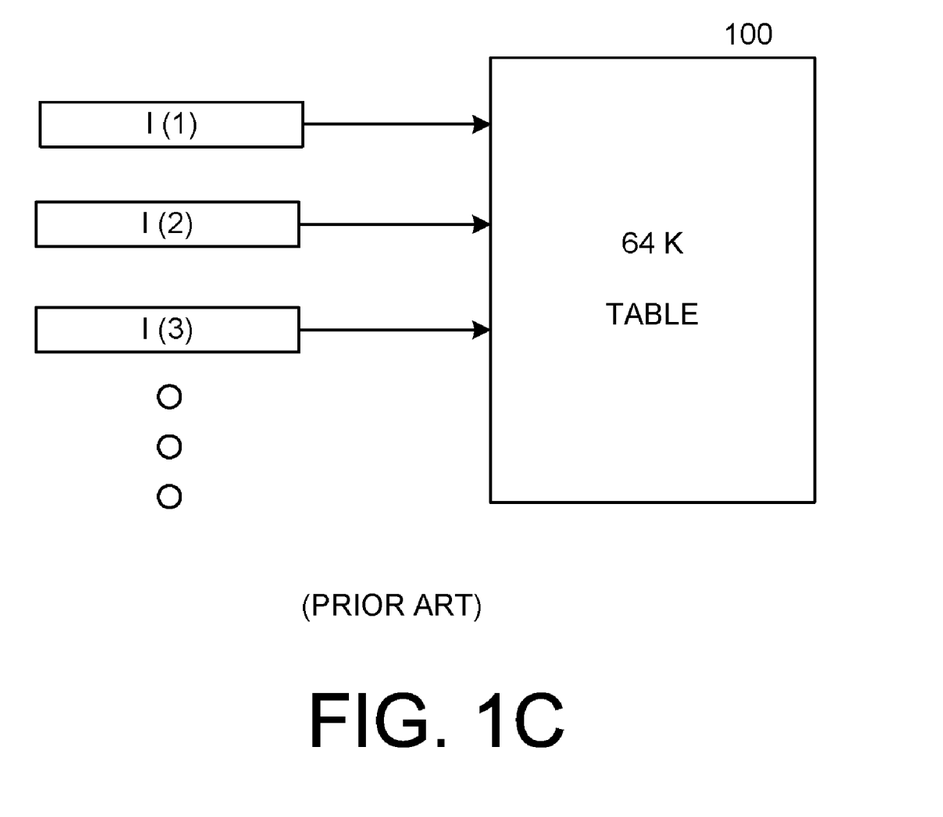
FIG. 1C is an illustration of a linear index into a 64K table of the prior art.

FIG. 1C is an illustration of a linear index into a 64K table. Indexes I(1), I(2), I(3) . . . are each linearly indexed into the 64K table giving a one to one correspondence between each index and each table entry. If indexes I(1), I(2), I(3) . . . each are 16 bits long an entry can be found in 16 clock cycles using standard binary searching. However, when a new address must be learned by inserting an entry or deleting an entry, it will take a long time to delete or insert the address from or to the table because the index must be sorted after each insertion and each deletion. In the worst case scenario each of the sixteen bit address indexes will have to be moved and sorted which will be time consuming. This sorting greatly degrades the performance of the switch. When the new address is inserted into the table, addresses will have to be moved up and/or down in order to make room for the new address. Therefore as the table size increases, the performance of the switch degrades.

Other methods make use of pointers, hash functions or tree functions to remedy the problem. Most of these methods, when implemented, have a "bad" worst case performance—particularly for insert and delete operations. As noted above, as the size of the table increases, performance becomes degraded. Some of the main reasons for the poor results are that the table size directly affects performance and the methods require extra storage and data structures.

SUMMARY OF THE INVENTION

The present invention is designed to overcome the deficiencies of the prior art and to increase the speed of data transmission.

In one embodiment, the present invention is a method of performing a table look-up. The method has the steps of receiving data through an input source; parsing the data into an index portion and a corresponding bucket portion; indexing the index portion to the corresponding bucket portion; and accessing table information stored in a look-up table using the bucket portion.

In another embodiment, the present invention is a table look-up indexing device. The table look-up indexing device has a receiver that receives incoming data; a data parser that parses the data into an index portion and a corresponding bucket portion; an indexer that indexes the index portion to the bucket portion; and a lookup device that accesses a look-up table using the corresponding bucket portion.

In a further embodiment, the present invention is a network switch having multiple ports used for receiving and exporting data. Each of the multiple ports are connected to one another through a communications medium. Multiple Address Resolution Logic (ARL) devices are connected to one of the multiple ports so that each of the multiple ports has a corresponding ARL device. Each of said multiple ARL devices is made up of a parser that parses data into an index portion and a corresponding bucket portion; an indexer that indexes said index portion to a corresponding bucket portion; and a look-up device that accesses table entries in a look-up table using the bucket portion.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

The present invention is a method and apparatus that performs a table look-up that parses incoming data into an index portion and a bucket portion and uses the index portion and bucket portion to do a look-up.

FIG. 1A illustrates a network switch 50 having 5 ports, 52, 54, 56, 58 and 60. Each of the 5 ports have corresponding switching tables 62, 64, 66, 68 and 70, respectively. Each of the switching tables 62, 64, 66, 68 and 70 has Address Resolution Logic (ARL) and Lookup Tables (L Tables). Each of the 5 ports are connected to one another through a communications line 72.

When data is received by one of the ports 52, 54, 56, 58 or 60 the data is indexed by the corresponding ARL. Simultaneously the data is sent to all the ports to determine which port the data should be sent to for output. When the output port is determined the ARL stores the output port data in the L Table using the index. In this way the output port for a particular type of data is "learned".

Once the output port for a particular type of data is "learned", when a port receives data, the ARL indexes the data and "looks up" the proper output port in the look-up table, L Table. The data is then sent to the appropriate port for output and the step of sending data to every port is eliminated thereby speeding up the switching process.

For Example, suppose initial data is received by port 52 and is to be output through port 60. Initially data is sent to all the ports to determine the proper output port. When the proper output port is determined, the initial data is sent to switching table 62 to be indexed by the ARL and the output port data is stored in the look-up table, L Table using the index created by the ARL. In the present case the L Table contains output port data directing any data with a particular index to be sent to port 60.

When port 52 receives subsequent data, switching table 62 indexes the data and "looks up" the index in the look-up table, L Table. If the subsequent data has the same index as the initial data and is found in the look-up table, the look-up table will show that the subsequent data should be sent to port 60 for output and the subsequent data will be automatically sent to port 60 for output.

If the subsequent data is indexed and the index is not found in the look-up table, the subsequent data will be sent to all ports to determine the appropriate output port. The subsequent data will then be indexed and the output port information stored in a look-up table by switching table 62. The subsequent data is now "learned" and the next time incoming data comes in with the same index as the subsequent data, the incoming data will be immediately sent to the proper port for output since the data or index is now "learned".

Figure 2A:
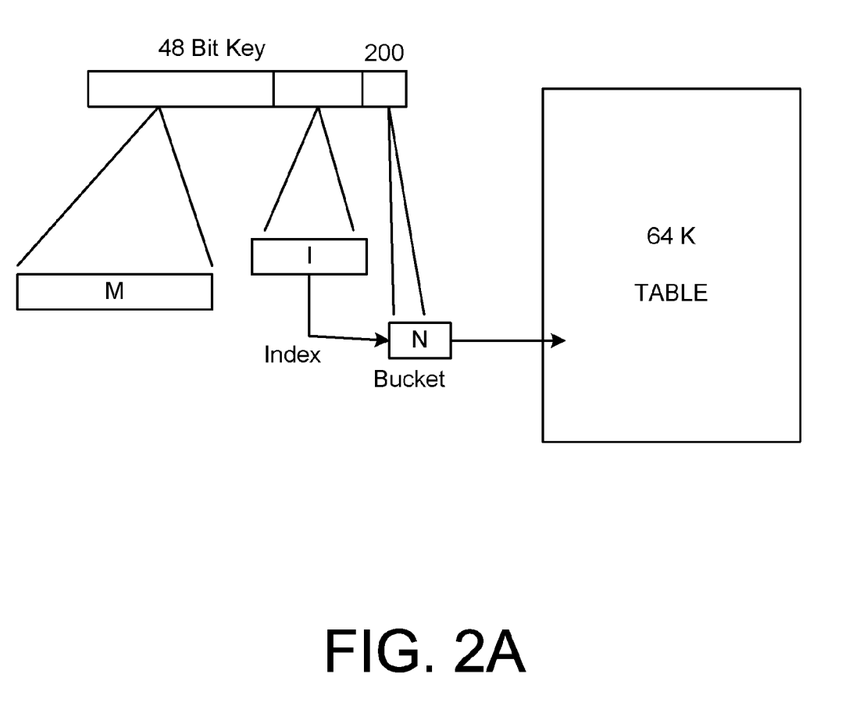
FIG. 2A is an illustration of a 48 bit key being parsed into and index portion and a bucket portion to select a particular entry in a 64K table.

FIG. 2A illustrates a data structure 200 made up of 48 bits used as data for being received by ports 52, 54, 56, 58 and 60. This 48 bit data structure 200, commonly referred to as a key, is typically some type of address that is parsed into multiple groups. In the present case the data structure depicted in FIG. 2A is parsed into 3 segments; segment M, index segment I and bucket segment N. Bucket segment N is designated as the bucket, index segment I is designated as the index, and segment M is the remaining bits of the key.

For a key size of 48 and a table size of 64K, 16 bits are used for indexing. The 48 bit key is parsed into 3 segments, segment M, index segment I and bucket segment N.

Figure 2B:
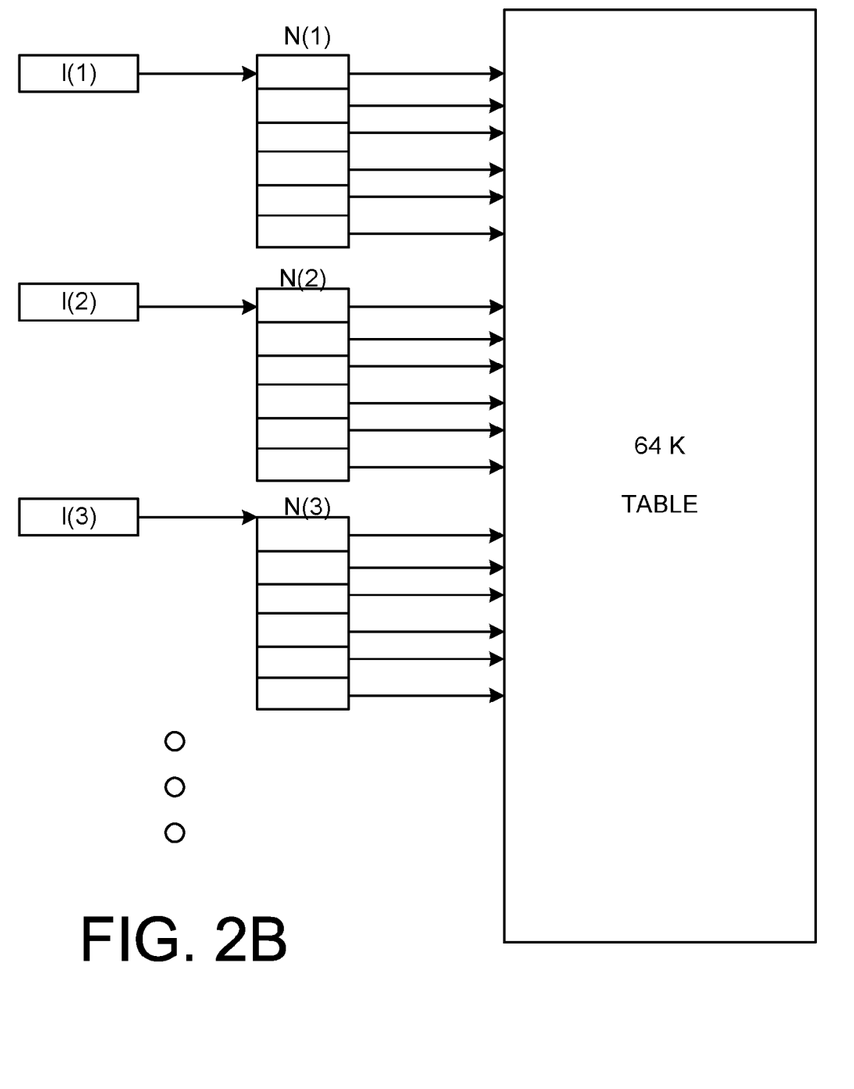
FIG. 2B is an illustration of indexing a 64K table using an index portion and a bucket portion for multiple indexes.

FIG. 2B is an illustration of an index segment I(1) linearly indexed to a bucket segment N(1), an index segment I(2) linearly indexed to a bucket segment N(2) and an index segment I(3) linearly indexed to a bucket segment N(3) .... Each index segment I selects a bucket segment N and the combination of index segment I and index segment N selects an entry in the table. Each bucket segment N can be programmed to have a particular size. Since the size of index segment I is dependent upon the size of bucket segment N, the size of index segment I will change accordingly.

Figure 3:
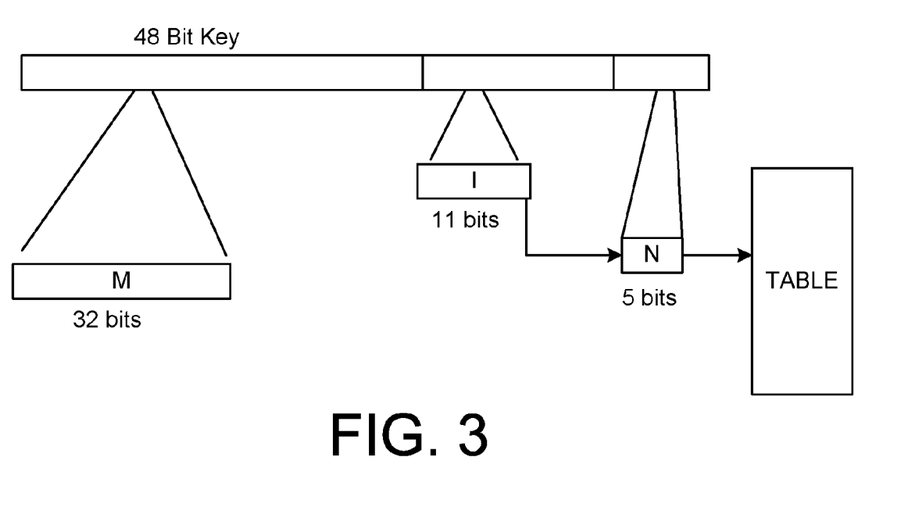
FIG. 3 is an illustration of a 48 bit key having a bucket size of 32 and being indexed into a 64K table.

FIG. 3 illustrates a 48 bit key having a bucket size of 32 (i.e. bucket segment N is 5 bits long and $2^5=32$) for a 64K table. Since it takes 16 bits ($64K=2^{16}$) to index the 64K table and the bucket size is 32 (5 bits long), index segment I is 11 bits long (16 bits−5 bits=11 bits) and segment M is 32 bits long (48 bits−16 bits=32 bits).

Index segment I is called the index and is linearly indexed to a bucket which is designated as a bucket segment N. The combination of the index and bucket directly selects an entry in the table. Therefore once the index is selected it will take a maximum of five clock cycles to search the bucket and only 5 bits will have to be binary sorted for an insert or delete operation. Thus an insert or delete function is dependent on the bucket size which can be programmed to fit a particular need.

It is noted that in some instances it is important to select bits from a key for index segment I that will have recurring index segments I for all incoming keys. This will allow for bucket sizes of 2 or greater which is more desirable for high speed switching.

In some applications manufacturers of chips use a manufacturers identification number as part of the key. Therefore it may be valuable to use bits in the key used for the manufacturers identification number as part of the index segment I. Another useful method for indexing index segment I is to use an XOR index where the index is XORed with the remaining bits of the key.

Figure 4A:
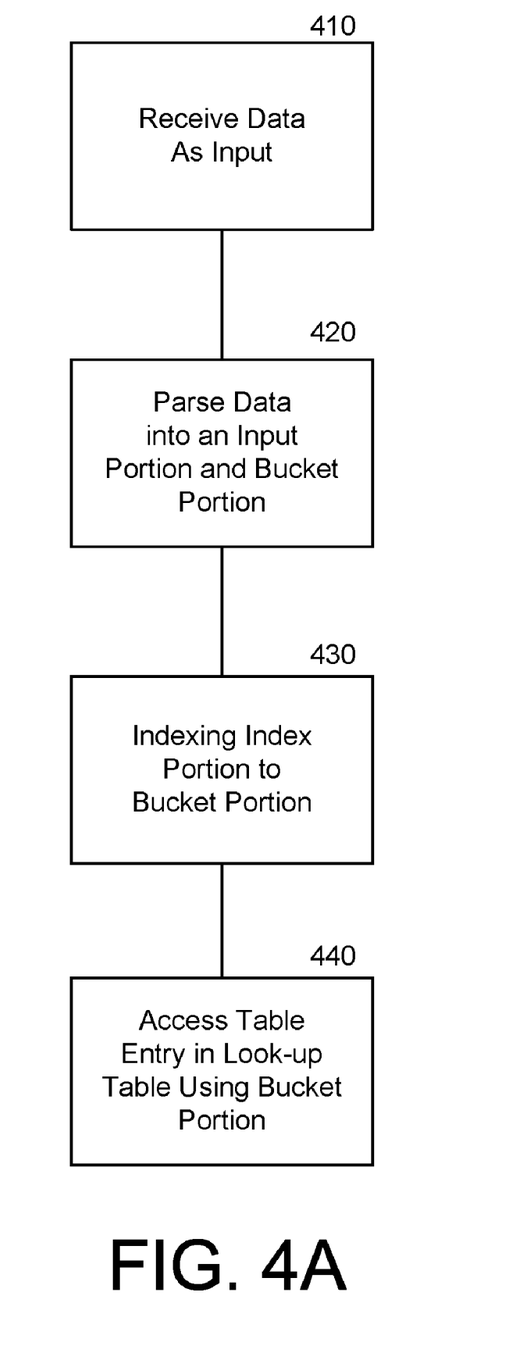
FIG. 4A is an illustration of the method steps of an embodiment of the present invention.

FIG. 4A is an illustration of the steps needed to index a look-up table in accordance with the present invention. In step 410 data is received as input. The data is then parsed, in step 420, into an index portion and a corresponding bucket portion. In step 430 the index portion is indexed to the bucket portion. In step 440 table information stored in a look-up table is accessed using the bucket portion.

Figure 4B:
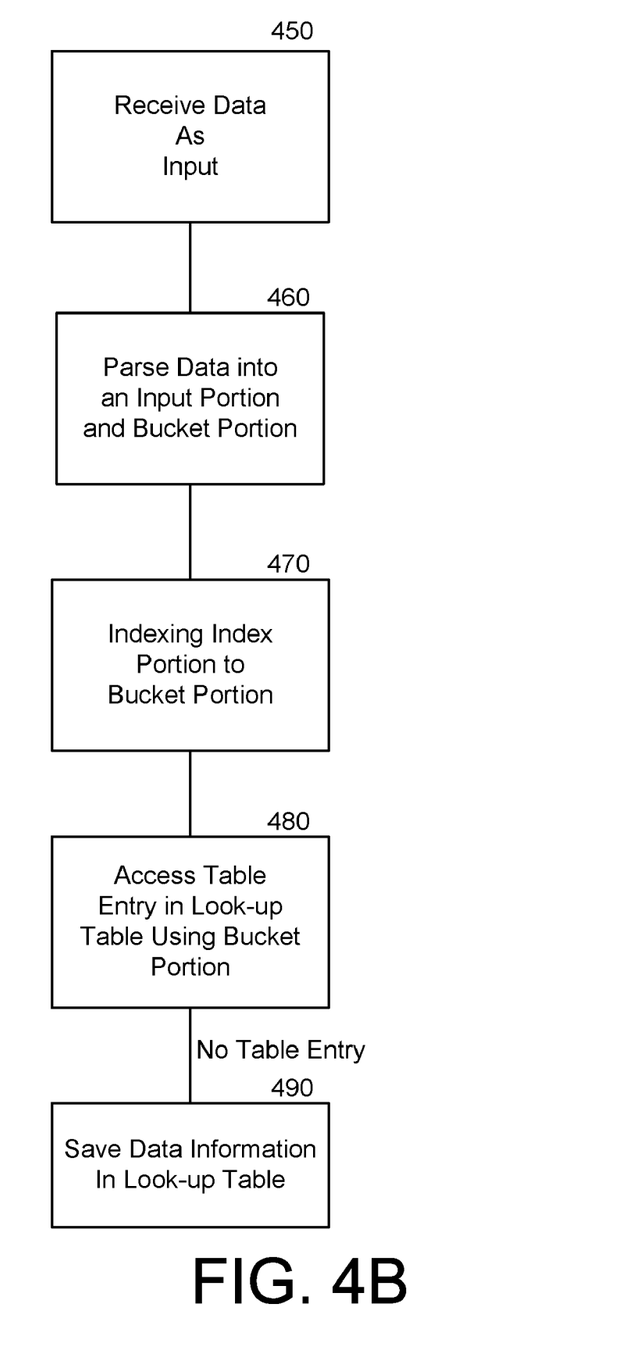
FIG. 4B is an illustration of the method steps of another embodiment of the present invention.

FIG. 4B has very similar steps to the steps illustrated in FIG. 4A. In step 450 data is received in a port. The data is then parsed, in step 460, into an index portion and a corresponding bucket portion. In step 470 the index portion is indexed to the bucket portion. The major difference from the steps illustrated in FIG. 4A and those illustrated in FIG. 4B is the following final step. In step 480 table information stored in a look-up table is accessed using the bucket portion. However, if there is no table information stored in the look-up table for the bucket portion, the present invention stores table information into the look-up table corresponding to the bucket portion as depicted in step 490.

In one embodiment of the invention a MAC address is received in a port of a network switch having multiple ports. The MAC address is parsed into an index portion and a bucket portion. The index portion is indexed to a bucket portion and the bucket portion is used to access a table entry in a look-up table to determine which port the MAC address and associated data should be sent to for output. If there is a table entry for the corresponding bucket portion the MAC address and associated data will be sent to the proper port for output. In the case where there is no table entry the port for output has to be "learned". This is accomplished by sending the MAC address to all ports in the switch. The proper port for output will send a message back that it is the proper port for output and this information is stored in the look-up table with the corresponding bucket. Therefore any subsequent MAC addresses having the same index and bucket will be able to access the table entry in the look-up table to determine the proper port for output without sending the MAC address to all the ports in the switch.

Figure 5:
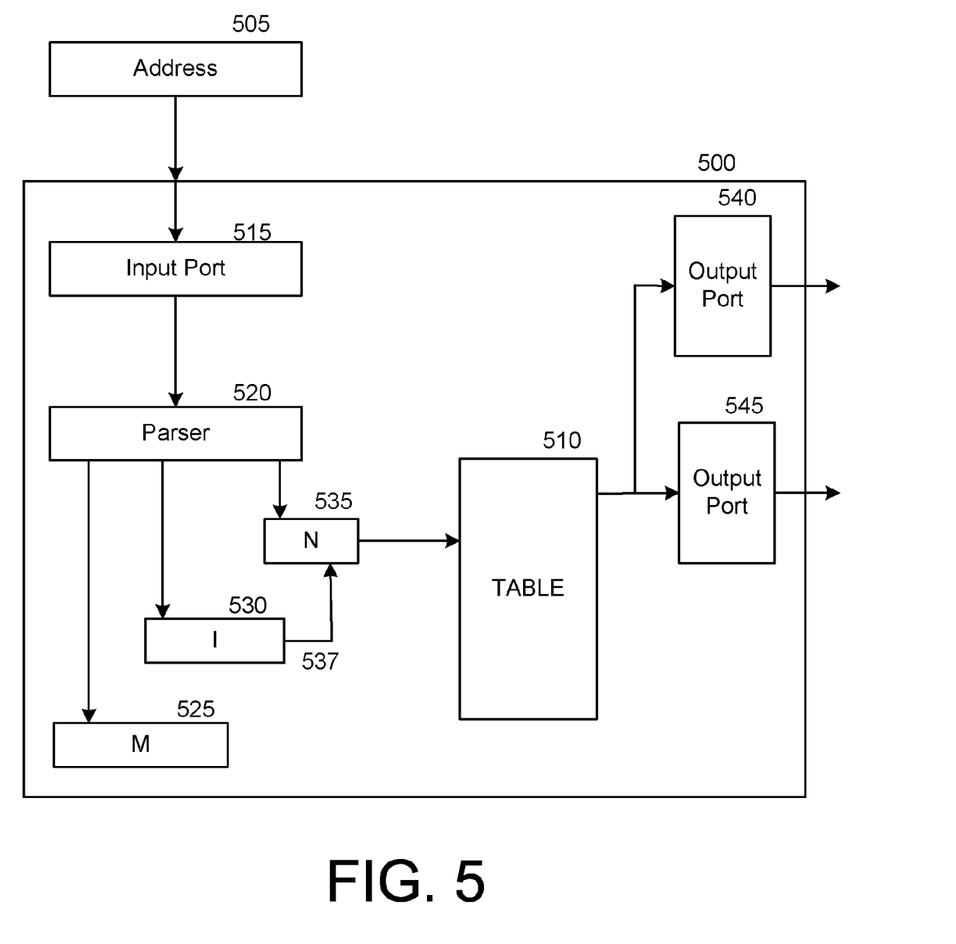
FIG. 5 is an illustration of a network switch receiving an address and using an index portion and bucket portion to identify a particular entry in a table to determine the appropriate output port for data transmission.

FIG. 5 is an illustration of a switch 500. In order to transmit data at a very quick and efficient manner switch 500 learns which output port each incoming MAC addresses 505 is to be transmitted and stores this information in table 510. When a new MAC address 505 is received by switch 500, the MAC address is looked-up in table 510 and switched to the proper destination output port 540 or 545.

An address 505 is received by switch 500 through an input port 515. The input port 515 transmits address 505 to parser 520. Parser 520 segments address 505 into three parts, segment 525 labeled as M, segment 530 labeled as I and segment 535 labeled as N. Segment I is linearly indexed to a bucket 535 and bucket 535 directly indexes a entry in table 510. In effect bucket 535 does a look up in table 510 in order to determine which of output ports 540 or 545 are to be used to transmit incoming data. The Index I merely selects a bucket.

Figure 6:
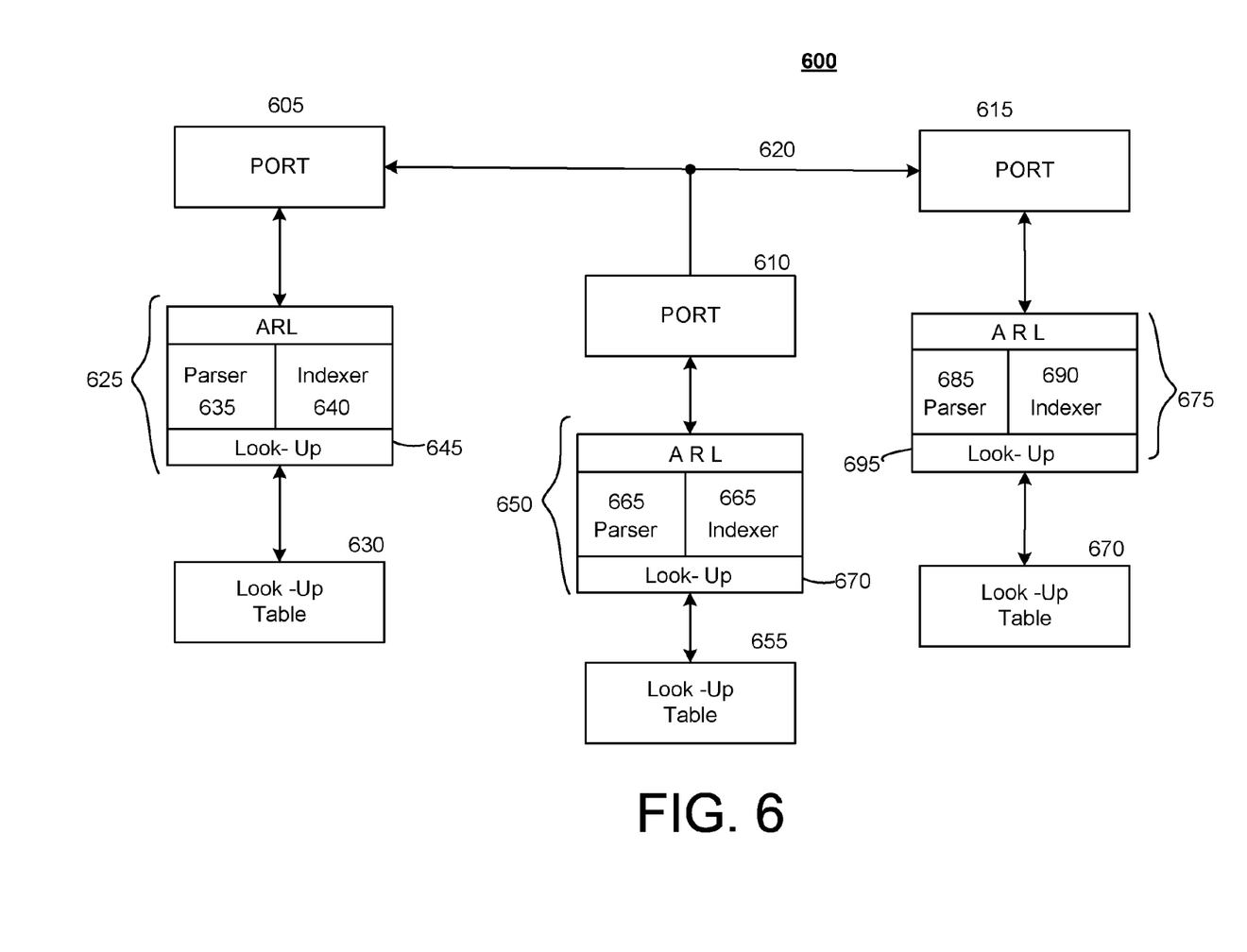
FIG. 6 is an illustration of a network switch in accordance with the present invention.

FIG. 6 is an illustration of a network switch 600 having a port 605, a port 610 and a port 615. Each of these ports are connected to one another through a communications line 620.

Port 605 has a corresponding Address Resolution Logic device (ARL) 625 and a corresponding look-up table 630. ARL 625 is made up of a parser 635, an indexer 640 and a look-up device 645.

Port 610 has a corresponding Address Resolution Logic device (ARL) 650 and a corresponding look-up table 655. ARL 650 is made up of a parser 660, an indexer 665 and a look-up device 670.

Port 615 has a corresponding Address Resolution Logic device (ARL) 675 and a corresponding look-up table 680. ARL 675 is made up of a parser 685, an indexer 690 and a look-up device 695.

In the event that port 605 receives a MAC address to be sent to port 610, the operation of the switch is as follows. A MAC address is received in port 605 of network switch 600 having multiple ports 605, 610 and 615. The MAC address is sent to ARL 625 to be processed. Parser 635 parses the MAC address into an index portion and a bucket portion. Indexer 640 indexes the index portion to a bucket in look-up 645. The bucket portion in look-up 645 is used to access a table entry in look-up table 630 to determine which port the MAC address and associated data should be sent to for output. If there is a table entry for the corresponding bucket portion the MAC address and associated data will be sent to the proper port for output. In this case the look-up table entry will direct the MAC address and associated data to output port 610. However, if there is no table entry the port for output has to be "learned". This is accomplished by sending the MAC address to all ports, ports 605, 610 and 615, in switch 600. The proper port for output will send a message back that it is the proper port for output and this information is stored in look-up table 630 with the corresponding bucket. In this case port 610 will send port 605 a signal indicating that port 610 is the proper port for output and this information is stored in look-up table 630. Therefore any subsequent MAC addresses having the same index and bucket will be able to access the table entry in the look-up table to determine the proper port for output without sending the MAC address to all the ports in the switch.

An advantage of the present invention is that insert and delete operations will no longer be dependent upon table size. As discussed above, address look-ups in the prior art are dependent upon table size. Therefore if the table size is 64K the index will be 16 bits long. Thus an insert or delete operation will involve sorting and moving 16 bit indexes.

However, the present invention for a 64K table with a bucket size of 32 (5 bits) will only have an 11 bit index (16 bits−5 bits=11 bits). Therefore once a bucket is selected by an index, insert or delete operations will depend on the bucket size and involve the sorting and moving of, in this case, 5 bit bucket indexes which is much more efficient than the sorting and moving of 16 bit indexes.

Although the invention has been described based upon the embodiments discussed above, it would be apparent to those skilled in the art that certain modifications, variations and alternative constructions would be apparent, while remaining within the spirit and scope of the invention. For example instead of using a linear index an XOR index is appropriate in certain circumstances. Likewise the bucket and index sizes are programmable to accommodate different circumstances and be tailored to specific needs.

What is claimed is:

1. An apparatus for performing a table look-up in a network device comprising:

receiving means for receiving a data packet through an input port of the network device;

parsing means for parsing said data packet into an index portion and a corresponding bucket portion;

indexing means for indexing, directly, said index portion to said corresponding bucket portion; and accessing means for accessing address table information stored in an address look-up table using said bucket portion.

2. A method comprising:

receiving data including a Media Access Control (MAC) address at a port of a network switch having multiple ports;

parsing the MAC address into an index portion and a bucket portion;

indexing the index portion to the bucket portion; and accessing an entry in a look-up table based on the bucket portion to determine which port of the multiple ports the data should be sent for output.

3. An apparatus comprising:

receiving means for receiving data including a Media Access Control (MAC) address at a port of a network switch having multiple ports;

parsing means for parsing the MAC address into an index portion and a bucket portion;

indexing means for indexing the index portion to the bucket portion; and accessing means for accessing an entry in a look-up table based on the bucket portion to determine which port of the multiple ports the data should be sent for output.

4. The apparatus of claim 1 wherein said indexing means for indexing said index portion to said bucket portion comprises indexing means for linearly indexing said index portion to said bucket portion.

5. The apparatus of claim 1 wherein said indexing means for indexing said index portion to said bucket portion comprises indexing means for Exclusive OR (XOR) indexing said index portion to said bucket portion.

6. The apparatus of claim 1 and further comprising sorting means for sorting said bucket portion.

7. The apparatus of claim 1 and further comprising sorting means for binary sorting said bucket portion.

8. The apparatus of claim 1 wherein said parsing means for parsing said data packet into an index portion and a corresponding bucket portion further comprises parsing means for parsing said index portion so that said index portion will recur when other data is parsed into said index portion and said corresponding bucket portion.

9. The apparatus of claim 1 and further comprising storing means for storing information regarding said data in said address look-up table as address table information when no address table information is available using said bucket portion to access address table information.

10. The method of claim 2 and further comprising storing information regarding said data in said address look-up table as address table information when no address table information is available using said bucket portion to access address table information.

11. The method of claim 2 and further comprising:
   determining that there is no entry in the look-up table based on the bucket portion;
   sending the Media Access Control (MAC) address to multiple ports on the network switch, when there is no entry in the look-up table based on the bucket portion;
   receiving a message from a responding port of the network switch indicating that the responding port is the port for outputting data corresponding to the bucket portion; and
   adding an entry in the look-up table indicating that the responding port corresponds to the bucket portion.

12. The apparatus of claim 3 and further comprising storing means for storing information regarding said data in said address look-up table as address table information when no address table information is available using said bucket portion to access address table information.

13. The apparatus of claim 3 and further comprising:
   determining means for determining that there is no entry in the look-up table based on the bucket portion;
   sending means for sending the MAC address to multiple ports on the network switch, when there is no entry in the look-up table based on the bucket portion;
   receiving means for receiving a message from a responding port of the network switch indicating that the responding port is the port for outputting data corresponding to the bucket portion; and
   adding means for adding an entry in the look-up table indicating that the responding port corresponds to the bucket portion.

* * * * *